United States Patent [19]

Nagahara et al.

[11] Patent Number: 5,939,138
[45] Date of Patent: Aug. 17, 1999

[54] TREATMENT FOR REDUCING FRICTION OF SEAT BELTS

[75] Inventors: Hideo Nagahara; Hiroyuki Terasawa; Isoo Saito; Eiji Ohtsubo, all of Okazaki, Japan

[73] Assignee: Toray Industries, Inc., Japan

[21] Appl. No.: 08/930,662

[22] PCT Filed: Jul. 19, 1996

[86] PCT No.: PCT/JP96/02029

§ 371 Date: Oct. 6, 1997

§ 102(e) Date: Oct. 6, 1997

[87] PCT Pub. No.: WO98/03723

PCT Pub. Date: Jan. 29, 1998

[30] Foreign Application Priority Data

Jan. 20, 1995 [JP] Japan .................................. 7-007142

[51] Int. Cl.$^6$ ................................ B05D 3/02; B05D 3/12
[52] U.S. Cl. ........................ 427/177; 427/386; 427/387; 427/389.9; 427/401; 428/394; 428/395; 528/272; 528/301

[58] Field of Search .................................. 427/389.9, 401, 427/386, 387, 177; 428/394, 395; 528/222, 301

[56] References Cited

U.S. PATENT DOCUMENTS

| 4,605,571 | 8/1986 | Watanabe et al. | ............... 427/389.9 X |
| 5,002,801 | 3/1991 | Barnewall | ......................... 427/389.9 X |

*Primary Examiner*—Michael Lusignan
*Attorney, Agent, or Firm*—Austin R. Miller

[57] ABSTRACT

A treatment for reducing friction of seat belts which is characterized by containing therein a polyether polyester having an average molecular weight of 2000–15000 which is obtained from a polyether diol and an aliphatic carboxylic acid, and preferably further containing a silicone compound. This treatment can be applied to either seat belt yarns in the yarn-making step or to seat belt webbing. The resulting seat belt is superior in slip properties and retains them even after wear. It is also superior in retractiablity and wear resistance (durability).

18 Claims, No Drawings

TREATMENT FOR REDUCING FRICTION OF SEAT BELTS

TECHNICAL FIELD

The present invention relates to a treatment for reducing friction of seat belts which can be added not only to yarns for seat belts in the yarn-making stage but also to seat belt webbing. More particularly, the present invention relates to a friction-reducing treatment to give seat belts which are smoothly retractable and durable and retains good retractability even after wear.

BACKGROUND ART

It has been common practice to apply a resin coating to the surface of the seat belt webbing after weaving and dyeing. This resin coating is intended to permit the seat belt to be pulled out and retracted smoothly (or to improve retractability). On the other hand, yarns for seat belts are given a variety of treatments such as spinning finish in the spinning and drawing stages.

A known example of the coating resin for improvement of wear resistance of seat belts is a resin based on a urethane prepolymer (block copolymer). (Japanese Patent Publication No. 66948/1992) After application to the seat belt webbing, this coating resin undergoes heat treatment for crosslinking. The crosslinked resin imparts very good slip properties initially and retains them at a certain level even after use for a long period of time.

A known example of the conventional treatment for seat belt yarns is a compound composed mainly of a branched alcohol, an ester of higher fatty acid, and a nonionic surface active agent (not containing propylene oxide), as disclosed in Japanese Patent Laid-open No. 175966/1990. The first two components function as a smoothing agent and the last component contributes to light resistance.

Unfortunately, the resin-coated seat belt, especially the one coated with a resin of crosslinking type, has the disadvantage of its surface coating becoming stiff after use for a long period of time. The stiff surface coating resin gradually drops off due to repeated rubbing against the nylon belt guide. In addition, the belt surface becomes soiled with time. Stiffening and soiling prevent the seat belt from being pulled out and retracted smoothly.

In the case where seat belts are made of spin-dyed yarns, the step of dyeing the seat belt webbing is not necessary. Therefore, attempts have been made to perform resin coating (for friction reduction) in the yarn-making step, thereby omitting not only dyeing but also resin coating after the seat belt webbing has been made. However, the conventional coating resin for friction reduction is so sticky that it prevents smooth unwinding from cheese package if it is given to yarns. In addition, the coating resin applied to yarns give rise to scum at the belt-weaving stage. Therefore, such attempts are not successful so far.

The seat belt made of resin-coated yarns may be used as such without subsequent resin coating. The seat belt of this type does not decrease rapidly in slipperiness due to the dropping of resin. However, it does not fully decrease in fiber-to-fiber friction or fiber-to-metal friction. Hence it is so poor in initial slipperiness and wear resistance that it is not yet in practical use.

The present invention was completed to address the above-mentioned problems involved in the conventional technology. It is an object of the present invention to provide a friction-reducing treatment which can be applied to both seat belt yarns and seat belt webbing. This friction-reducing treatment contributes to the low friction coefficient of yarns constituting the seat belt and hence makes the seat belt highly slippery in the initial stage. In addition it retains its good slip characteristics for a long period of use. The friction-reducing treatment realizes the seat belt which keeps its good retractability and wear resistance for a long period of use.

It is another object of the present invention to provide a treatment for reducing friction of seat belts which is suitably used in the case where dyeing and resin finishing are not performed on the seat belt webbing.

DISCLOSURE OF THE INVENTION

The present invention covers a treatment to be applied to seat belt yarns and/or seat belt webbing to reduce friction of seat belts. This treatment is characterized by containing therein a polyether polyester having an average molecular weight of 2000–15000 which is obtained from a polyether diol and an aliphatic carboxylic acid.

Owing to the specific polyether polyester, the friction-reducing treatment of the present invention easily permeates into seat belt yarns and uniformly covers the surface of filaments inside each yarn (when applied to seat belt yarns) or uniformly covers the surface of seat belt as well as the surface of filaments inside the seat belt (when applied to the seat belt webbing).

Therefore, the treatment of the present invention does not form the dual layer structure consisting of the belt (fiber) layer and the resin layer unlike the conventional seat belt having its surface coated with resin. This means that even after the surface fibers have worn out due to use for a long time, the treatment remains on the surface of inner fibers and permits the seat belt to have low friction necessary for good retractability. In addition, the treated seat belt keeps good wear resistance.

BEST MODE FOR CARRYING OUT THE INVENTION

According to the present invention, it is necessary that the treatment employ a polyether polyester which has an average molecular weight of 2000–15000 and is a polyether polyester obtained from a polyether diol and an aliphatic carboxylic acid.

The polyether polyester should have the above-specified average molecular weight so that it exhibits good slip properties and an ability to permeate into yarns and webbing. With an average molecular weight smaller than 2000, it does not exhibit its desirable slip properties because of insufficient film strength. With an average molecular weight greater than 15000, it does not exhibit its desirable slip properties because of insufficient improvement in friction reduction. A preferred average molecular weight is in the range of 3000 to 10000.

The polyether polyester should preferably be one which has its both terminals blocked with a monobasic fatty acid, like a compound which is formed by esterifying both terminals of a dibasic acid with a polyether (mentioned later) and further esterifying its both terminals with a monobasic fatty acid.

The polyether as a constituent of the polyether polyester should preferably have an average molecular weight of 600–6000. It includes a polymer of ethylene oxide and/or propylene oxide and polytetramethylene glycol. The latter is preferable. If its average molecular weight is smaller than 600, the resulting treatment is poor in slip properties due to insufficient film strength. If its average molecular weight is greater than 6000, the resulting treatment is poor in slip properties due to excessive friction. A preferred average molecular weight is in the range of 800 to 4000.

Incidentally, the average molecular weight used in the present invention is the number-average molecular weight determined by gel permeation chromatography (GPC).

The carboxylic acid as another constituent of the polyether polyester should be an aliphatic carboxylic acid. In the case where a dibasic acid and a monobasic acid are used in combination with each other as the carboxylic acid, it is necessary that at least either or preferably both are aliphatic carboxylic acids. Any carboxylic acid having the cyclic structure (such as aromatic ring) is not desirable because the resulting polyether polyester does not exhibit the low friction characteristics as desired.

The dibasic acid as a constituent of the polyether polyester include maleic acid, adipic acid, thiodipropionic acid, and sebacic acid. The last three ones are preferable.

The monobasic fatty acid includes, for example, octylic acid, lauric acid, mystiric acid, palmitic acid, stearic acid, isostearic acid, oleic acid, ricinoleic acid, linolic acid, and linolenic acid. Of these examples, lauric acid, isostearic acid, and oleic acid are preferable.

The polyether polyester should preferably be one which remains liquid at normal temperature (20–25° C.), so that the treated seat belt does not become sticky at normal temperature at which it is used but exhibits its low-friction performance satisfactorily.

It is desirable that the above-mentioned polyether polyester accounts for 30–100 wt % of the total amount of the treatment. It is possible to use more than one kind of polyether polyester. With a content less than 30 wt %, the polyether polyester does not produce its desirable effect. A desirable content is in the range of 40 to 100 wt % so that the seat belt exhibits good slip properties and retains its good slip properties even after it has worn out.

The friction-reducing treatment of the present invention should preferably contain, in addition to the polyether polyester, a silicone compound (B) and/or an extreme pressure agent (D). Moreover, it may also contain additionally a lubricant (C) and a surface active agent (E). The total amount of these additional components should preferably be less than 70 wt %.

The silicone compound (B) includes, for example, polydimethyl siloxane and polymethylphenyl siloxane and modified silicone (such as those modified with amino, polyether, carboxyl, or alkyl), all having a viscosity of 100–10000 cSt at 25° C. Preferred examples are polydimethyl siloxane and amino-modified silicone having a viscosity of 200–7000 cSt at 25° C.

The amount of the silicone compound (B) should be 2–50 wt %, preferably 5–35 wt %, of the treatment. With an amount less than 2 wt %, the silicone compound does not fully produce its effect, so that the treated seat belt is poor in slip properties and retractability at low temperatures (for example, at −20° C. in a severe winter). With an amount more than 50 wt %, the silicone compound prevents the polyether polyester from fully producing its effect, with the result that the desired friction properties are not obtained due to low film strength and poor slip properties after wear.

The lubricant (C) includes, for example, mineral oil (such as purified spindle oil and liquid paraffin), vegetable oil (such as coconut oil and castor oil), fatty acid ester (such as isostearyl laurate, oleyl oleate, and dioleyl adipate), alkyl ether ester (such as laurate of ethylene oxide (2 mol) adduct of lauryl alcohol and laurate of ethylene oxide (3 mol) adduct of tridecyl alcohol), and wax. Of these examples, fatty acid ester and alkyl ether ester are preferable.

The amount of the lubriant (C) should be 5–30 wt %, preferably 10–20 wt %.

The extreme pressure agent (D) enhances the film strength of the treatment. It includes, for example, fatty acid soap (such as oleic acid soap and erucic acid soap), organic phosphate salt (such as potassium lauryl phosphate and sodium oleyl phosphate), and organic sulfonate (such as sodium dodecylbenzenesulfonate).

The amount of the extreme pressure agent (D) should be 0.02–10 wt %, preferably 1–5 wt %. With an amount less than 0.02 wt %, the extreme pressure agent does not fully produce its effect of enhancing the film strength. With an amount more than 10 wt %, it adversely affects the slip properties of the treatment because of increased viscosity.

The surface active agent (E) includes, for example, alkylene oxide adduct of higher alcohol (such as ethylene-propylene oxide adduct of octyl alcohol, ethylene-propylene oxide adduct of stearyl alcohol, and ethylene oxide adduct of oleyl alcohol) and alkylene oxide adduct of polyhydric alcohol ester (such as ethylene oxide (25 mol) adduct of hardened castor oil and ethylene oxide (20 mol) adduct of sorbitan trioleate).

The amount of the surface active agent should be 5–20 wt %, preferably 10–15 wt %.

The friction-reducing treatment of the present invention may contain, in addition to the above-mentioned components, optional additives such as alkali metal, alkylene oxide adduct of alkyl amine (as pH adjuster), antioxidant, UV light absorber, and fluorine compound.

The amount of the pH adjuster should be 0.02–10 wt %, preferably 0.03–8 wt %. The total amount of other additive should be 0.02–10 wt %, preferably 0.03–5 wt %.

The friction-reducing treatment of the present invention should preferably be used in the form of 1–20 wt % aqueous emulsion for seat belt yarns and seat belt webbing. The concentration of the emulsion may be higher than specified above so long as the emulsion can stick to and permeate into yarns and webbing. The emulsion may be used as such or after dilution with an organic solvent. A 2–10 wt % aqueous emulsion is preferable.

The 1–20 wt % aqueous emulsion should preferably have a surface tension lower than 35 dyne/cm at 25° C. and a canvas permeation value lower than 15 seconds at 25° C. These conditions are necessary for the emulsion to stick to and permeate into yarns and webbing satisfactorily. With a surface tension higher than 35 dyne/cm, the emulsion does not stick to yarns and webbing satisfactorily. With a canvas permeation value greater than 15 seconds, the emulsion does not readily permeate into yarns and webbing and hence the resulting seat belt does not keep its retractability for a long time.

The friction-reducing treatment of the present invention may be applied in the form of aqueous emulsion to seat belt yarns in the yarn-making process or to seat webbing.

For example, it is possible to apply the friction-reducing treatment to yarns after heat treatment and before winding in the yarn-making process (in which the spun synthetic fibers undergoes orientation and heat treatment). In this case, the friction-reducing treatment may be used as a spinning finish if the wound yarns can be loaded with a desired amount. Application to seat belt yarns may be carried out after winding (or before weaving); however, application immediately before winding in the yarn-making process is desirable. Application to yarns may be accomplished by using rollers or guides.

Application to the webbing (which has been prepared by weaving from seat belt yarns) may be accomplished by dipping the webbing in the solution or spraying the webbing surface with the solution. If dyeing is necessary, application should preferably be carried out after dyeing.

The loading of the treatment should be 0.05–5.0 wt % (in terms of the active ingredient for yarns). A preferred loading is 0.2–2.0 wt % in the case of application to yarns, and it is 0.1–1.5 wt % in the case of application to webbing.

The friction-reducing treatment of the present invention can be applied to either yarns or webbing so as to impart the low-friction characteristics required of seat belts. Therefore, it obviates the necessity of resin coating as in the prior art technology.

The friction-reducing treatment of the present invention is by superior in permeation to the conventional resin coating. Therefore, it deeply permeates into yarns and webbing, so that it uniformly covers the surface of seat belt webbing as well as the surface of yarns inside the seat belt webbing. In other words, it does not form the dual-layer structure (consisting of the belt (fiber) layer and the resin layer) unlike the conventional seat belt having its surface resin-coated. This offers the advantage that even after fibers in the belt surface have worn out due to prolonged use, inside yarns still hold the treatment and retain the low-friction characteristics. Therefore, the seat belt keeps good retractability and wear resistance.

The seat belt yarns and seat belt webbing to which the friction-reducing treatment of the present invention is applied are those which are made of synthetic fibers such as polyester fiber.

The yarns and webbing may be one which is composed of spin-dyed fibers. Spin-dyed fibers may be obtained in the usual way from a resin incorporated with a pigment such as carbon black, phthalocyanine blue, and red oxide.

The following is a probable reason why the friction-reducing treatment of the present invention gives a seat belt which is superior to conventional ones in retractability (slip properties) and wear resistance after a long period of use.

Conventional seat belts have their slip properties improved by coating with a resin composed mainly of urethane block prepolymer (as disclosed in Japanese Patent Publication No. 66948/1992). The problem involved in this prior art technology is that the resin layer covering the belt surface peels off after repeated use and the seat belt becomes extremely poor in slip properties (as mentioned above). There even is a case where peeled resin forms scum which stains the belt and aggravates the slip properties. To address this problem, many attempts have been made to develop a new resin superior in wear resistance and to coat the resin layer comparatively thick. No satisfactory results have been obtained yet.

By contrast, the present invention is intended to impart the desired slip properties to the surface of individual filaments constituting the belt instead of resorting to the resin-coated layer.

In the case of conventional seat belts, the resin coating layer stays mainly on the belt surface and only a small portion of resin permeates into the inside. In other words, the coating resin does not reach the surface of the filaments at the innermost layer of the belt. This can be confirmed by disintegrating the belt and analyzing the substance on the surface of fibers.

The friction-reducing treatment of the present invention permeates not only through the surface layer but also into the innermost layer of the belt, so that it covers the surface of individual filaments constituting the innermost layer of the belt. It is in this point that the present invention greatly differs from the prior art technology.

The conventional coating resin for seat belts has such a high viscosity that it makes it difficult to unwind yarns from the cheese package if it is applied to seat belt yarns in the yarn-making process. In addition, the coating resin applied to yarns gives rise to scum which causes troubles in the belt weaving process.

By contrast, the treatment of the present invention is not so sticky as the conventional seat belt coating resin; therefore, it does not substantially change the surface characteristics of yarns even in the case where it is applied to yarns in the yarn-making process and treated yarns are wound up as such. The result is that the unwinding of yarns from the cheese package is easy and there are no troubles due to scum in the belt weaving process and the belt weaving process can be carried out smoothly.

Application of the treatment to yarns obviates the necessity of the resin coating step in seat belt manufacturing and yet provides seat belts having good properties such as retractability and durability. This is effective particularly in the case where seat belts are produced (without dyeing) from spin-dyed yarns.

Incidentally, the dyeing of the seat belt webbing permits a subtler color tone than the spin-dyed yarns and in such a case it is desirable to apply the treatment to the webbing after dyeing.

As mentioned above, the friction-reducing treatment of the present invention can be used in any stage of production from yarn-making to belt weaving. Regardless of the stage of use, it imparts to seat belts good properties such as retractability and durability.

EXAMPLES

In Examples and Comparative Examples that follow, properties were evaluated in the following manner.

Fiber-to-fiber friction: Seat belt yarns which have been given the treatment are examined for the coefficient of friction between fibers by using a laser-type friction meter. The lower the value of friction coefficient, the smaller the friction between fibers, and hence the resulting seat belt is superior in slip properties.

Fiber-to-metal friction: As in the case above, seat belt yarns which have been given the treatment are examined for the coefficient of friction between fiber and metal by using a Toray-type high-load micron apparatus. The fiber rubs against metal at a rate of 0.5 m/min or 300 m/min. Friction at a rubbing rate of 0.5 m/min represents the film strength, whereas friction at a rubbing rate of 300 m/min represents the smoothness. The lower the value, the better the smoothness.

Surface tension of treating solution (dyne/cm): Measured at 25° C. by using an automatic surface tension meter (Model CBVP-A3, made by Kyowa Kaimen Kagaku Co., Ltd.).

Canvas permeation of treating solution (seconds): A sample of treating solution is placed in a 100-cc beaker and allowed to stand for 15 minutes in a constant temperature bath at 25° C. A piece of wool felt (2' 2' 3 mm thick) is gently placed on the surface of the sample solution and time (in seconds) required for the wool felt to sink is measured. The result is expressed in terms of an average of five measurements.

Sliding friction against guide (%): A 500-kg weight is attached to one end of the specimen and a 10-kg load cell is attached to the other end of the specimen. With the specimen bent through an angle of 20° at its middle by a guide, a force is applied to the load cell to pull up the weight. A first force (F1) to pull up the weight and a second force (F2) to hold the weight during its descent are recorded and the sliding friction (%) is expressed in terms of the square root of (F2/F1) multiplied by 100. The greater the value of sliding friction, the better the friction characteristics and hence the retractability.

Sliding friction after wear (%): A specimen of seat belt is rubbed 500 times with a piece of sandpaper (No. 500) under a load of 400 g. The worn specimen is examined for the sliding friction (%) in the same manner as mentioned above.

Retention of strength after wearing with a hexagonal rod (%): A specimen of seat belt is measured for strength after abrasion (5000 cycles) according to JIS-4604 (Test for wear resistance), and the ratio of strength after abrasion to strength before abrasion is regarded as the retention of strength.

Examples 1 to 8 and Comparative Examples 1 to 4

Polyethylene terephthalate was subjected to melt spinning. The emergent filaments were drawn at a rate of 500 m/min and then (without winding) underwent two-stage hot orientation (5 times in total) by hot rollers at 245° C. Immediately before winding, the drawn filaments were given a 20 wt % aqueous emulsion of the treatment having the composition as shown in Table 1 by using an oiling roll. The loading was 1.0 wt % (as active ingredient). The filaments were wound up at a rate of 3000 m/min. Thus there was obtained a seat belt yarn (1500 denier) consisting of 144 polyester filaments.

Symbols in Table 1 denote the following compounds.

A1–A4: Polyether polyester specified in the present invention.
A13: Polyether polyester not conforming to the present invention.
B1–B3: Silicone compound (B).
C1–C2: lubricant (C).
D1–D3: Extreme pressure agent (D).
E1–E4: Surface active agent (E).
F1–F2: Other compounds in additional additives.
R1–R2: Resin component in conventional resin coating.
A1: Ester of polytetramethylene glycol (2200) and thiodipropionic acid and isostearic acid. (average molecular weight=5000)
A2: Ester of polytetramethylene glycol (1200) and adipic acid and oleic acid. (average molecular weight=3000)
A3: Ester of ethylene oxide-propylene oxide copolymer (1700) and adipic acid and oleic acid. (average molecular weight=4000)
A4: Ester of ethylene oxide-propylene oxide copolymer (1400) and sebacic acid and isostearic acid. (average molecular weight=3500)
A13: Ester of polyoxyethylene glycol and phthalic acid (average molecular weight=5000)
B1: Polydimethylsiloxane (viscosity=350 cSt)
B2: Polydimethylsiloxane (viscosity=1000 cSt)
B3: Amino-modified silicone
C1: Oleyl oleate
C2: Isostearyl oleate
D1: Potassium lauryl (EO) 2 phosphate
D2: Sodium isostearyl alcohol (EO) 3 phosphate
D3: Oleic acid soap
E1: PO-EO adduct of lauryl alcohol (M.W.=1500)
E2: PO-EO adduct of octyl alcohol (M.W.=1500)
E3: EO adduct of oleyl alcohol (M.W.=900)
E4: EO (10 mol) adduct of hardened castor oil
F1: "IRGANOX" 245 (from Ciba-Geigy)
F2: EO (10 mol) adduct of stearylamine
R1: Resin composed mainly of hydroxyl group-containing silicone and urethane block prepolymer
R2: Methylol melamine resin In the list above, EO stands for ethylene oxide and PO stands for propylene oxide, with the number of moles added parenthesized.

The seat belt yarns coated with the treatment were tested for friction properties. The results are shown in Table 2.

The resulting seat belt yarns were woven into seat belt webbing in the usual way and the webbing was dyed black in the usual way. The dyed webbing was used as a seat belt without resin coating.

The thus obtained seat belt was tested for characteristic properties. The results are shown in Table 2.

It is apparent from Table 2 that in Examples 1 to 8 the seat belt yarns have a low friction coefficient and the seat belt webbing has good slip properties (in terms of friction against the guide) and keep them almost unchanged even after wear, which suggests good retractability and durability. The seat belt webbing also exhibited good resistance to wear by the hexagonal rod.

By contrast, it is noted that Comparative Examples 1 and 2 (in which the treatment is not incorporated with the specified polyether polyester) and Comparative Examples 3 and 4 (in which the conventional resin coating was used) gave seat belts which became significantly poor in slip properties after wear. (This is true especially for those samples which have a low coefficient of friction against the guide.) The seat belts were also poor in resistance to wear by the hexagonal rod.

In addition, Examples 1 to 8 give seat belt yarns which permit easy unwinding from the cheese package despite coating with the friction-reducing treatment. By contrast, Comparative Examples 3 and 4 (in which the conventional coating resin was used) gave seat belt yarns which pose difficulties in unwinding from the cheese package due to sticky fiber surface.

The friction-reducing treatments in Examples 2, 3, 7, and 8 were allowed to stand at −20° C. for 24 hours and their properties were evaluated. It was found that the samples in Examples 2 and 3 remained liquid owing to the silicone compound they contain, whereas the samples in Examples 7 and 8 became nearly solid.

The seat belt yarns coated with the friction-reducing treatment were tested for fiber-to-metal friction (300 m/min) at −20° C. It was found that the samples in Examples 2 and 3 exhibited good slip properties with a low friction coefficient, whereas the samples in Examples 7 and 8 were poor in slip properties with a high friction coefficient.

These results suggest that the silicone compound contributes to low friction properties at low temperatures.

Examples 9 to 14 and Comparative Examples 5 and 6

Melt spinning was carried out in the same manner as in Example 1 except that the raw material was replaced by a 40:1 blend composed of polyethylene terephthalate base chips (containing no pigment) and polyethylene terephthalate master batch containing 20 wt % carbon black. Thus there was obtained a seat belt yarn (1500 denier) consisting of 144 polyester filaments dyed in black.

Incidentally, the yarns were given (immediately before winding) the friction-reducing treatment whose composition is shown in Table 3. Symbols in Table 3 are defined as above except for the following.

A5: Ester of polytetramethylene glycol (2200) and thiodipropionic acid and oleic acid. (M.W.=5000)
A6: Ester of polytetramethylene glycol (1500) and adipic acid and isostearic acid. (M.W.=3600)
A7: Ester of ethylene oxide-propylene oxide copolymer (1500) and adipic acid and lauric acid. (M.W.=3500)
A8: Ester of ethylene oxide-propylene oxide copolymer (1700) and sebacic acid and isostearic acid. (M.W.=4100)

The seat belt yarns which were given the treatment were tested for friction characteristics. The results are shown in Table 4.

The seat belt yarns were woven into seat belt webbing in the usual way and the webbing was fabricated into seat belts without dyeing and resin coating.

The resulting seat belts were tested for characteristic properties. The results are shown in Table 4.

It is apparent from Table 4 that the friction-reducing treatment of the present invention is very effective for the seat belt yarns composed of spin-dyed fibers. The seat belt yarns gave seat belts having a low friction coefficient before and after abrasion and also having good wear resistance.

By contrast, the sample in Comparative Example 5 (for which the specified polyether polyester was not used) and the sample in Comparative Example 6 (for which the conventional coating resin was used) were poor in slip properties after wear and also poor in wear resistance and durability.

The seat belt yarns (spin-dyed) in Examples 9 to 14 permit easy unwinding from the cheese package, whereas those coated with the conventional coating resin in Comparative Example 6 pose difficulties in unwinding from the cheese package.

Examples 15 to 18 and Comparative Examples 7 and 8

The same procedure as in Example 1 was repeated to give a seat belt yarn (1500 denier) consisting of 144 polyester filaments, except that the friction-reducing treatment to be applied immediately before winding was replaced by the one whose composition is shown in Table 5. Symbols in Table 5 are defined as above except for the following.

A9: Ester of polytetramethylene glycol (1700) and adipic acid and oleic acid. (M.W.=4000)
A10: Ester of polytetramethylene glycol (1000) and thiodipropionic acid and isostearic acid. (M.W.=2700)
A11: Ester of polytetramethylene glycol and thiodipropionic acid and isostearic acid. (M.W.=1000)
A12: Ester of polytetramethylene glycol and sebacic acid and isostearic acid. (M.W.=20000)

The seat belt yarns coated with the treatment were tested for friction properties. The results are shown in Table 6.

The resulting seat belt yarns were woven into seat belt webbing in the usual way and the webbing was dyed in black and fabricated into seat belts in the usual way.

The resulting seat belts were tested for characteristic properties. The results are shown in Table 6.

It is apparent from Table 6 that the polyether polyester specified in the present invention produces its effect even when used in an extremely large amount. It was found that the resulting seat belts have a low coefficient of friction before and after wear and are superior in wear resistance and durability.

By contrast, Comparative Examples 7 and 8 (in which the polyether polyester was one which has a molecular weight outside the range specified in the present invention) gave seat belts which become significantly poor in slip properties after wear. (This is true especially for those samples which have a low coefficient of friction against the guide.) They are also poor in wear resistance and durability.

Examples 19 to 22 and Comparative Example 9

The same procedure as in Example 1 was repeated to give a seat belt yarn (1500 denier) consisting of 144 polyester filaments, except that the friction-reducing treatment was not applied to the yarn immediately before winding in the yarn-making process.

The resulting seat belt yarns were woven into seat belt webbing in the usual way and the webbing was dyed in black in the usual way and then dipped in a 5 wt % aqueous solution of the treatment whose composition is shown in Table 7. The loading of the treatment (as active ingredient) was 0.5 wt % of the total fiber weight. Dipping was followed by preliminary drying at 110° C. for 3 minutes and heat treatment at 150° C. for 3 minutes.

Symbols for components in Table 7 are defined as above.

The seat belts which were given the treatment were tested for performance. The results are shown in Table 8.

It is apparent from Table 8 that the friction-reducing treatment of the present invention produced a marked effect even when applied to the seat belt webbing; that is, it contributes to the retractability, durability, and wear resistance.

By contrast, the sample in Comparative Example 9 (which was given the conventional coating resin) became greatly poor in slip properties after wear despite its initial good slip properties. In addition, it was also poor in wear resistance.

Examples 23 to 25

The same procedure as in Example 9 was repeated to give a seat belt yarn (1500 denier) consisting of 144 polyester filaments (spin-dyed in black), except that the friction-reducing treatment was not applied to the yarn immediately before winding in the yarn-making process.

The resulting black seat belt yarns were woven into seat belt webbing in the usual way and the webbing was dipped in a 5 wt % aqueous solution of the treatment whose composition is shown in Table 9. The loading of the treatment (as active ingredient) was 0.5 wt % of the total fiber weight. Dipping was followed by preliminary drying at 110° C. for 3 minutes and heat treatment at 150° C. for 3 minutes.

Symbols for components in Table 9 are defined as above.

The seat belts which were given the treatment were tested for performance. The results are shown in Table 10.

It is apparent from Table 10 that the friction-reducing treatment of the present invention produced a marked effect also on the seat belt webbing made of spin-dyed yarns.

EXPLOITATION IN INDUSTRY

The friction-reducing treatment of the present invention can be applied to seat belt yarns as well as seat belt webbing. The resulting seat belt exhibit good slip properties (or retractability) even after wear and also has good durability. If the treatment is applied to the seat belt webbing it is not necessary to apply resin coating for friction reduction. If the treatment is applied to spin-dyed yarns, the resulting seat belt webbing does not need dyeing and resin coating. The present invention permits the production of seat belts having outstanding characteristics.

TABLE 3

| Component | Example | | | | | | Comparative Example | |
|---|---|---|---|---|---|---|---|---|
| | 9 | 10 | 11 | 12 | 13 | 14 | 5 | 6 |
| A5 | | 94 | | | | 68 | | |
| A6 | | | 80 | | | | | |
| A7 | 100 | | | | 73 | | | |
| A8 | | | | 89 | | | | |
| B1 | | 5 | | 5 | 1 | | 1 | |

TABLE 1

| Component | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| A1 | | 70 | | | | 60 | | | | | | |
| A2 | | | 64 | | | | 100 | 58 | | | | |
| A3 | 65 | | | | 55 | | | | | | | |
| A4 | | | | 68 | | | | | | | | |
| A13 | | | | | | | | | | 70 | | |
| B1 | 30 | | | | | 10 | | | | 20 | | |
| B2 | | 29 | | | 20 | | | | | | | |
| B3 | | | 34 | 26 | | | | | | | | |
| C1 | | | | | 15 | | | 19 | 59 | 5 | | |
| C2 | | | | | | 10 | | | | | | |
| D1 | 5 | | | | 4 | 5 | | | | 5 | | |
| D2 | | | 2 | 5 | | | | | | | | |
| D3 | | | | | | 1 | | 1 | 1 | | | |
| E1 | | | | | 5 | | | 15 | 20 | | | |
| E2 | | | | | | 12 | | | | | | |
| E3 | | | | | | | | | 10 | | | |
| E4 | | | | | | | 5 | 10 | | | | |
| F1 | | | | | 1 | 1 | | 1 | | | | |
| F2 | | 1 | | 1 | | 1 | | 1 | | | | |
| R1 | | | | | | | | | | | 100 | |
| R2 | | | | | | | | | | | | 100 |

Note: Quantities in terms of wt %.

TABLE 2

| Items of evaluation | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Surface tension of solution (dyne/cm) | 32.0 | 32.0 | 32.1 | 32.5 | 32.5 | 32.0 | 31.9 | 32.2 | 37.0 | 34.2 | 37.0 | 36.0 |
| Canvas permeation of solution (sec) | 11.5 | 11.4 | 11.2 | 12.0 | 11.5 | 12.0 | 11.3 | 11.4 | 27.5 | 18.5 | 28.0 | 32.5 |
| Fiber-to-fiber friction | 0.241 | 0.240 | 0.245 | 0.244 | 0.251 | 0.250 | 0.243 | 0.251 | 0.302 | 0.250 | 0.260 | 0.312 |
| Fiber to-metal friction 0.5 m/min | 0.109 | 0.111 | 0.109 | 0.108 | 0.106 | 0.105 | 0.114 | 0.113 | 0.132 | 0.118 | 0.108 | 0.142 |
| 300 m/min | 0.242 | 0.242 | 0.241 | 0.240 | 0.248 | 0.247 | 0.252 | 0.251 | 0.271 | 0.262 | 0.268 | 0.280 |
| Sliding friction against guide (%) | 59.8 | 59.9 | 59.7 | 59.7 | 58.9 | 59.5 | 58.6 | 58.7 | 54.4 | 57.4 | 59.2 | 54.1 |
| Sliding friction after wear (%) | 58.7 | 58.8 | 58.7 | 58.8 | 58.4 | 58.9 | 57.5 | 57.6 | 52.2 | 50.1 | 51.0 | 47.8 |
| Retention after wear by hex rod (%) | 87.4 | 88.3 | 87.8 | 89.1 | 86.7 | 87.7 | 86.6 | 86.0 | 79.4 | 84.1 | 82.5 | 81.9 |

TABLE 3-continued

|  | Example | | | | | | Comparative Example | |
|---|---|---|---|---|---|---|---|---|
| Component | 9 | 10 | 11 | 12 | 13 | 14 | 5 | 6 |
| B3 |  | 15 |  |  |  |  |  |  |
| C1 |  |  |  | 15 |  |  | 58 |  |
| C2 |  |  |  |  | 10 |  |  |  |
| D1 |  |  | 5 |  | 5 | 5 |  |  |
| D2 |  |  |  | 5 |  |  |  |  |
| D3 |  |  |  |  |  | 1 |  |  |
| E1 |  |  |  | 5 |  |  | 20 |  |
| E2 |  |  |  |  |  | 14 |  |  |
| E3 |  |  |  |  |  |  | 10 |  |
| E4 |  |  |  |  |  |  | 10 |  |
| F1 |  |  |  |  | 1 | 1 |  |  |
| F2 |  | 1 |  | 1 |  | 1 |  |  |
| R1 |  |  |  |  |  |  |  | 100 |

Note: Quantities in terms of wt %.

TABLE 4

|  | Example | | | | | | Comparative Example | |
|---|---|---|---|---|---|---|---|---|
| Items of evaluation | 9 | 10 | 11 | 12 | 13 | 14 | 5 | 6 |
| Surface tension of solution (dyne/cm) | 33.0 | 33.2 | 33.1 | 33.5 | 33.4 | 33.0 | 37.0 | 37.0 |
| Canvas permeation of solution (sec) | 12.5 | 12.2 | 12.3 | 12.5 | 12.0 | 12.5 | 27.5 | 28.0 |
| Fiber-to-fiber friction | 0.242 | 0.241 | 0.243 | 0.244 | 0.253 | 0.252 | 0.310 | 0.261 |
| Fiber to-metal friction 0.5 m/min | 0.119 | 0.113 | 0.110 | 0.111 | 0.112 | 0.120 | 0.134 | 0.109 |
| 300 m/min | 0.255 | 0.240 | 0.242 | 0.244 | 0.251 | 0.252 | 0.270 | 0.268 |
| Sliding friction against guide (%) | 58.5 | 59.8 | 59.4 | 59.4 | 58.6 | 58.4 | 54.5 | 59.1 |
| Sliding friction after wear (%) | 57.9 | 59.0 | 58.0 | 58.7 | 57.9 | 57.8 | 52.1 | 50.9 |
| Retention afterwear by hex rod (%) | 87.5 | 88.2 | 88.1 | 88.0 | 86.5 | 87.6 | 78.5 | 82.5 |

TABLE 5

|  | Example | | | | Comparative Example | |
|---|---|---|---|---|---|---|
| Component | 15 | 16 | 17 | 18 | 7 | 8 |
| A9 | 100 | 90 | 78 |  |  |  |
| A10 |  |  |  | 99 |  |  |
| A11 |  |  |  |  | 100 |  |
| A12 |  |  |  |  |  | 100 |
| C1 |  |  | 16 |  |  |  |
| D1 |  | 9 |  |  |  |  |
| D3 |  | 1 |  |  |  |  |
| E1 |  |  | 5 |  |  |  |
| F1 |  |  | 1 |  |  |  |
| F2 |  |  |  | 1 |  |  |

TABLE 6

|  | Example | | | | Comparative Example | |
|---|---|---|---|---|---|---|
| Items of evaluation | 15 | 16 | 17 | 18 | 7 | 8 |
| Surface tension of solution (dyne/cm) | 33.0 | 33.4 | 33.3 | 33.0 | 33.5 | 34.5 |
| Canvas permeation of solution (sec) | 12.0 | 12.3 | 12.14 | 12.0 | 13.5 | 15.5 |
| Fiber-to-fiber friction | 0.245 | 0.242 | 0.244 | 0.243 | 0.252 | 0.240 |
| Fiber-to-metal friction 0.5 m/min | 0.115 | 0.100 | 0.113 | 0.116 | 0.116 | 0.125 |
| 300 m/min | 0.245 | 0.243 | 0.242 | 0.243 | 0.240 | 0.260 |
| Sliding friction against guide (%) | 59.5 | 59.4 | 59.5 | 59.7 | 59.5 | 55.7 |
| Sliding friction after wear (%) | 58.8 | 59.3 | 58.8 | 59.2 | 50.2 | 52.3 |
| Retention after wear by hex rod (%) | 87.4 | 88.8 | 89.1 | 88.3 | 80.3 | 86.0 |

TABLE 7

| Component | Example 19 | Example 20 | Example 21 | Example 22 | Comparative Example 9 |
|---|---|---|---|---|---|
| A1 | 74 | | | | |
| A2 | | 65 | | 98 | |
| A4 | | | 90 | | |
| B1 | 15 | | | | |
| B3 | | 30 | 5 | | |
| C2 | 5 | 3 | 4 | | |
| D1 | 1 | 1 | | 2 | |
| D2 | | | 1 | | |
| E1 | 5 | | | | |
| E4 | | 1 | | | |
| R1 | | | | | 100 |

Note: Quantities in terms of wt %.

TABLE 8

| Items of evaluation | Example 19 | Example 20 | Example 21 | Example 22 | Comparative Example 9 |
|---|---|---|---|---|---|
| Surface tension of solution (dyne/cm) | 32.5 | 32.2 | 32.9 | 32.3 | 37.0 |
| Canvas permeation of solution (sec) | 12.0 | 11.6 | 12.1 | 11.9 | 28.0 |
| Sliding friction against guide (%) | 59.6 | 59.6 | 59.1 | 58.8 | 59.2 |
| Sliding friction after wear (%) | 58.9 | 58.8 | 58.7 | 58.0 | 50.5 |
| Retention after wear by hex rod (%) | 88.7 | 88.0 | 88.3 | 87.9 | 82.3 |

TABLE 9

| Component | Example 23 | Example 24 | Example 25 |
|---|---|---|---|
| A1 | 65 | | 99 |
| A4 | | 72 | |
| B1 | 9 | 5 | |
| B2 | 13 | 5 | |
| D1 | 4 | | 1 |
| D2 | | 5 | |
| E1 | 9 | | |
| E4 | | 13 | |

TABLE 10

| Items of evaluation | Example 23 | Example 24 | Example 25 |
|---|---|---|---|
| Surface tension of solution (dyne/cm) | 33.2 | 33.1 | 32.4 |
| Canvas permeation of solution (sec) | 12.0 | 12.3 | 11.8 |
| Sliding friction against guide (%) | 59.7 | 59.2 | 58.7 |
| Sliding friction after wear (%) | 58.9 | 58.8 | 58.0 |
| Retention after wear by hex rod (%) | 88.3 | 88.2 | 88.0 |

We claim:

1. A composition useful for reducing friction of seat belts comprising a polyether polyester having an average molecular weight of 2000–15000 which is obtained from a polyether diol and an aliphatic carboxylic acid.

2. The composition of claim 1, wherein the polyether constituting the polyether polyester has an average molecular weight of 600–6000 and comprises at least one material selected from the group consisting of ethylene oxide polymer propylene oxide polymer and polytetramethylene glycol.

3. The composition of claim 1, wherein the polyether polyester is an ester formed from a polyether diol and a dibasic acid and a monobasic fatty acid.

4. The composition of claim 1, wherein the polyether polyester is an ester formed from polytetramethylene glycol having an average molecular weight of 600–6000 and a dibasic acid and a monobasic fatty acid.

5. The composition of claim 1, wherein the polyether polyester has an average molecular weight of 3000–10000.

6. The composition of claim 1, wherein the polyether polyester accounts for more than 30 wt % of the total amount of the composition.

7. A composition useful for reducing friction of seat belts which is a 1–20 wt % aqueous emulsion containing as an active ingredient the composition defined in claim 1, characterized in that the surface tension at 25° C. is lower than 35 dyne/cm and the canvas permeation at 25° C. is shorter than 15 seconds.

8. A yarn of synthetic fibers for seat belts which is coated with the composition defined in claim 1 in an amount of 0.05–5.0 wt % for the weight of the yarn.

9. A yarn for seat belts as defined in claim 8, wherein the synthetic fibers are spin-dyed fibers.

10. A yarn for seat belts as defined in claim 8, wherein the synthetic fibers are polyester fibers.

11. A process for producing a yarn for seat belts which comprises applying the composition defined in claim 1 to the fibers immediately before winding in the step of producing synthetic fibers from a polymer by spinning.

12. A seat belt formed from the seat belt webbing of synthetic fiber which is impregnated with the composition defined in claim 1 in an amount of 0.05–5.0 wt % of the weight of the webbing.

13. A seat belt as defined in claim 12, wherein the synthetic fibers are spin-dyed fibers.

14. A seat belt as defined in claim 12, wherein the synthetic fibers are polyester fibers.

15. A process for producing a seat belt which is characterized in that the seat belt webbing is woven from spin-dyed yarns for seat belts which are impregnated with the composition defined in claim 1 in an amount of 0.05–5.0 wt % of the weight of the yarns, and the webbing is made into seat belts substantially without dyeing and resin coating.

16. A composition useful for reducing friction of seat belts comprising a polyether polyester and at least one material selected from a silicone compound and an extreme pressure agent, said polyether polyester having an average molecular weight of 2000–15000 and is formed from a diol compound and an aliphatic carboxylic acid.

17. The composition of claim 16, wherein the silicone compound accounts for 2–50 wt % of the total amount of the composition.

18. The composition of claim 16, wherein the extreme pressure agent accounts for 0.02–10 wt % of the total amount of the composition.

* * * * *